(12) United States Patent
Bahr

(10) Patent No.: US 9,288,822 B2
(45) Date of Patent: Mar. 15, 2016

(54) METHOD FOR ADVERTISING CHANNEL RESERVATIONS

(75) Inventor: Michael Bahr, München (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 234 days.

(21) Appl. No.: 13/992,318

(22) PCT Filed: Dec. 7, 2011

(86) PCT No.: PCT/EP2011/072125
§ 371 (c)(1),
(2), (4) Date: Jun. 7, 2013

(87) PCT Pub. No.: WO2012/076620
PCT Pub. Date: Jun. 14, 2012

(65) Prior Publication Data
US 2013/0258991 A1    Oct. 3, 2013

(30) Foreign Application Priority Data

Dec. 7, 2010   (EP) .................................... 10194020

(51) Int. Cl.
*H04W 80/04*    (2009.01)
*H04W 88/06*    (2009.01)
*H04W 28/04*    (2009.01)
*H04W 72/04*    (2009.01)
(Continued)

(52) U.S. Cl.
CPC ........ *H04W 74/002* (2013.01); *H04W 74/0816* (2013.01); *H04W 74/04* (2013.01); *H04W 84/18* (2013.01)

(58) Field of Classification Search
CPC ..... H04W 80/04; H04W 88/06; H04W 28/04; H04W 72/04
USPC ................................................... 370/328, 329
See application file for complete search history.

(56) References Cited

U.S. PATENT DOCUMENTS 7,843,819 B1    11/2010    Benveniste ................... 370/230
8,310,999 B2    11/2012    Seok et al. .................... 370/329

FOREIGN PATENT DOCUMENTS

CN    101889414 A    11/2010    ............... H04B 7/26
EP       2059084 A1     5/2009    ............... H04L 12/54
(Continued)

OTHER PUBLICATIONS

Japanese Office Action, Application No. 2013-542530, 3 pages, Jul. 7, 2014.
(Continued)

*Primary Examiner* — Ronald B Abelson
(74) *Attorney, Agent, or Firm* — Slayden Grubert Beard PLLC

(57) ABSTRACT

A method is disclosed for advertising channel reservations by an advertisement in a wireless mesh network, the advertisement being adapted for at least partially advertising channel reservations known by a transmitting node. The method includes: mapping at least one channel reservation to an advertisement element identifier, the advertisement element identifier identifying an advertisement element; considering said advertisement element to contain a set of channel reservations assigned to said advertisement identification number; and advertising said reservation by transmitting said advertisement element characterized by said advertisement element identifier.

24 Claims, 2 Drawing Sheets

(51) Int. Cl.
*H04W 74/00* (2009.01)
*H04W 74/08* (2009.01)
*H04W 74/04* (2009.01)
*H04W 84/18* (2009.01)

(56) References Cited

FOREIGN PATENT DOCUMENTS

| WO | 2011/144626 A1 | 11/2011 | ............ H04W 74/08 |
| WO | 2012/076620 A1 | 6/2012 | ............ H04W 74/04 |

OTHER PUBLICATIONS

Cicconetti, C. et al., "Scheduling and Dynamic Relocation for IEEE 802.11s Mesh Deterministic Access," Mesh and Ad Hoc Communications and Networks, 5$^{th}$ Annual IEEE Comunications Society Conference on IEEE, 10 pages, Jun. 2008.

Hiertz, Guido R. et al., "IEEE 802.11s: The WLAN Mesh Standard," IEEE Wireless Communications, vol. 17, No. 1, 8 pages, Feb. 2010.

Bahr, Michael, "MCCAOP Advertisements," IEEE 802.11-10/815r0, 14 pages, Jul. 14, 2010.

IEEE P802.11s™/D7.03, Draft Standard for Information Technology—Telecommunications and Information Exchange between Systems—Local and Metropolitan Area Networks—Specific Requirements—, Part 11: Wireless LAN Medium Access Control (MAC) and Physical Layer (PHY) Specifications, Amendment 1: Mesh Networking, 342 pages, Nov. 2010.

Bahr, Michael, "MCCAOP Advertisements," IEEE 802.11-10/815r1, 16 pages, Nov. 10, 2010.

Bahr, Michael, "MCCAOP Advertisements," IEEE 802.11-10/814r1, 14 pages, Nov. 10, 2010.

International Search Report and Written Opinion, Application No. PCT/EP2011/072125, 12 pages, Apr. 17, 2012.

| Element ID | Length | Advertise-ment Se-quence Number | MCCA Information | TX-RX Times Report | Broadcast Times Report | Interfering Times Report |
|---|---|---|---|---|---|---|
| Octets: 1 | 1 | 1 | 4 | variable | variable | variable |

| B0 – B7 | B8 – B15 | B16 | B17 | B18 | B19 | B20 | B21 | B22 – B(21+m) | B(21+m+1) – B31 |
|---|---|---|---|---|---|---|---|---|---|
| MCCA Access Fraction | MCCA Access Fraction Limit | Accept Reservations | TX-RX Report Present | Broadcast Report Present | Interfering Report Present | Partial Advertisements Element | Last Advertisements Element | Advertisement Elements Identifier | Reserved |
| Bits: 8 | 8 | 1 | 1 | 1 | 1 | 1 | 1 | m | 32-22-m |

FIG 3

| B0 – B16 | B17 | B18 | B19 | B20 | B21 | B22 | B23 | B24 – B(23+m) | B(23+m+1) – B31 |
|---|---|---|---|---|---|---|---|---|---|
| these fields as in Figure 3 | TX-RX Report Present | Broadcast Report Present | Interfering Report Present | Partial TX-RX Report | Partial Broadcast Report | Partial Interfering Report | Last Advertisement Element | Advertisement Element Identifier | Reserved |
| Bits: 17 | 1 | 1 | 1 | 1 | 1 | 1 | 1 | m | 32-24-m |

FIG 4

| These fields are as in Figure 3 or in Figure 4 | Last Advertisements Element | Advertisements Element Identifier | All Advertisements Elements | Reserved |
|---|---|---|---|---|
| Bits: x | 1 | m | 1 | y |

FIG 5

METHOD FOR ADVERTISING CHANNEL RESERVATIONS

CROSS-REFERENCE TO RELATED APPLICATIONS

This application is a U.S. National Stage Application of International Application No. PCT/EP2011/072125 filed Dec. 7, 2011, which designates the United States of America, and claims priority to EP Patent Application No. 10194020.3 filed Dec. 7, 2010. The contents of which are hereby incorporated by reference in their entirety.

TECHNICAL FIELD

This disclosure relates to an information element and method for advertising channel reservations in a wireless mesh network, particularly according to IEEE 802.11s Draft Standard for WLAN Mesh Networking.

BACKGROUND

In sections 7.3.2.104-107 of the known IEEE 802.11s Draft Standard for WLAN Mesh Networking, version D7.03, a deterministic access mechanism for wireless mesh networks called MCCA (Mesh Coordinated Channel Access) is described.

The time between subsequent DTIM Beacons (Delivery Traffic Indication Message) is divided into a fixed number of MCCA time slots. These time slots can be reserved between neighboring mesh stations. An MCCA reservation, hereinafter also referred to as channel reservation, contains periodic definition of so-called MCCAOPs (MCCA opportunities). An MCCAOP is a continuous set of MCCA time slots that can be used for transmission. The initiator of such a reservation is called the MCCAOP owner, and has the right to transmit during the MCCAOP. The receiver is called the MCCAOP responder.

Due to a distributed nature of a wireless mesh network and due to its shared transmission medium it is necessary that each mesh station distributes its MCCA reservations at least in its 2-hop neighborhood. The reservations are reported by advertisements, which contain reservations of the sending mesh station and, additionally, reservations of its neighboring mesh stations.

In order to enhance a limited opportunity of advertising channel reservations of past drafts of the IEEE 802.11s Draft Standard for WLAN Mesh Networking, it has been proposed to include multiple information fields into an advertisements element according to the standard, each of the information fields including reported MCCAOP reservations. These fields are defined in section 7.3.2.106.3 of the known IEEE 802.11s Draft Standard for WLAN Mesh Networking, version D7.03 as MCCAOP Reservation fields. At the time of the priority date of this application, the detailed structure of advertisements elements has not been finally approved in the draft standard.

Currently, advertised reservations are arbitrarily distributed over advertisement elements. This arbitrary nature bears a couple of significant disadvantages. A major disadvantage lies in a higher data traffic which results from the necessity of advertising a whole set of reservations even in cases when only a minor change in the reservations is to be advertised.

SUMMARY

One embodiment provides a method for advertising channel reservations by an advertisement in a wireless mesh network, the advertisement being adapted for at least partially advertising channel reservations known by a transmitting node, the method comprising: mapping at least one channel reservation to an advertisement element identifier identifying an advertisement element; considering said advertisement element to contain a set of channel reservations assigned to said advertisement identification number; and advertising said reservation by transmitting said advertisement element identified by said advertisement element identifier.

In a further embodiment, the method comprises advertising a deletion of a reservation by transmitting an advertisement element in which the reservation to be deleted is omitted from a complete set of reservations contained in said advertisement element.

In a further embodiment, the method comprises advertising an addition of a reservation by transmitting an advertisement element in which the reservation to be added is included in a set of reservations contained in said advertisement element.

In a further embodiment, a fixed number of advertisements elements is provided.

In a further embodiment, said advertisement element includes a field indicating whether all advertisement elements of an advertisement set are advertised.

In a further embodiment, said advertisement element includes a field indicating the highest used advertisement element index.

In a further embodiment, advertisement elements with an advertisement element index exceeding the highest used index are considered empty and complete.

In a further embodiment, said advertisement element is included in an MCCAOP advertisements frame.

Another embodiment provides a node in a mesh network comprising means for carrying out any of the methods disclosed above.

Another embodiment provides a computer program product, which contains a program code stored on a non-transitory computer-readable medium and which, when executed by a processor of a node in a mesh network, carries out any of the methods disclosed above.

BRIEF DESCRIPTION OF THE DRAWINGS

Exemplary embodiments will be explained in more detail below on the basis of the schematic drawings, wherein:

FIG. 3 shows an exemplary structure of an MCCA information field according to one embodiment;

FIG. 4 shows an exemplary structure of an alternative MCCA information field according to an alternative embodiment; and FIG. 5 shows an exemplary structure of an alternative MCCA information field according to an alternative embodiment.

DETAILED DESCRIPTION

Figures 1, 2:
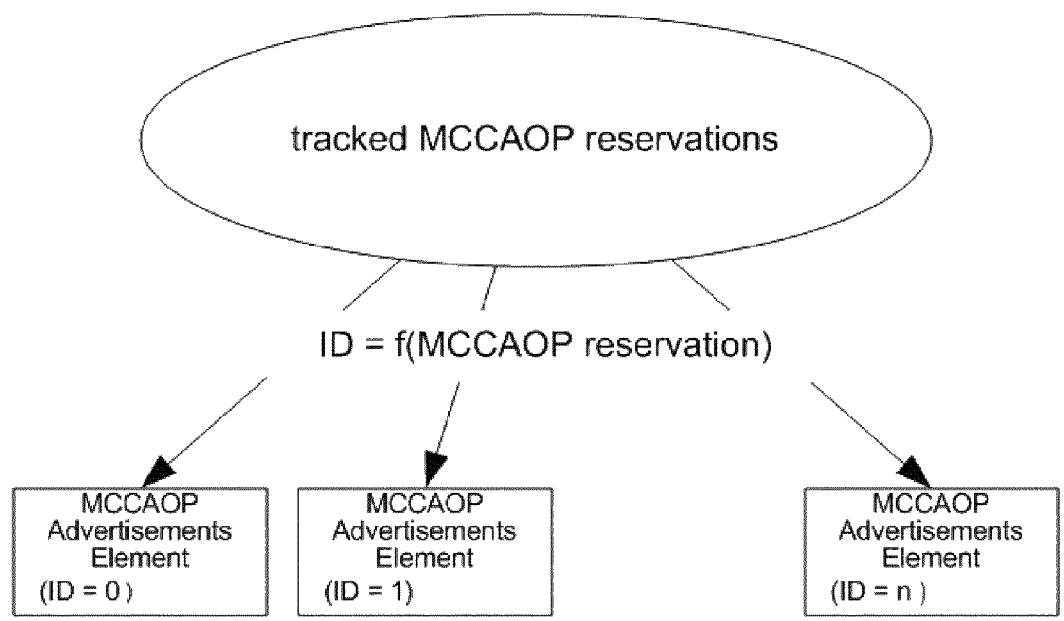
FIG. 1 shows an exemplary overview of an operation mode according to one embodiment.
FIG. 2 shows an exemplary structure of an MCCAOP advertisements element according to one embodiment.

Some embodiments of the present invention provide a method of advertising reservations which allow a more flexible composition of advertisements.

For example, a method for advertising channel reservations by an advertisement in a wireless mesh network is proposed, the advertisement being adapted for at least partially advertising channel reservations known by a transmitting node, the method comprising the steps of;

mapping at least one channel reservation to an advertisement element identifier, the advertisement element identifier identifying an advertisement element;

considering said advertisement element to contain a set of channel reservations assigned to said advertisement identification number;

advertising said reservation by transmitting said advertisement element being characterized by said advertisement element identifier.

Some embodiments may allow fixing a distribution of tracked reservations to specific advertisements elements. In other words a fixed mapping between a tracked reservation and advertisements element identifier may be achieved by the proposed method. The proposed method may allow to avoid sending unchanged advertisements elements and to further forward such advertised reservations.

According to one embodiment a deletion of a reservation is advertised by transmitting an advertisement element in which the reservation to be deleted is omitted in the complete set of reservations contained in said advertisement element.

According to one embodiment an addition of a reservation is advertised by transmitting an advertisement element in which the reservation to be added is contained in a set of reservations contained in said advertisement element.

According to one embodiment it is assumed that a fixed number of advertisements elements is provided. The fixed number preferably has a value of $2^m$ whereby m is positive integer. A respective value of possible advertisements element identifiers consequently ranges from zero to $(2^m-1)$.

The current IEEE 802.11s draft standard for WLAN mesh networking (version D7.03) defines an MCCAOP Advertisements element which is used to advertise MCCAOP reservations of a mesh station to its neighbors.

However, it is not clear how such an MCCAOP Advertisements element with such a format is used during the operation of the wireless mesh network. Especially, if there are changes to the reservations and if there are more MCCAOP reservations to be advertised than the maximal possible number of reservations in a single MCCAOP Advertisements element.

The method proposed hereinafter provides procedures assuming a set of reservations that needs to be advertised. This set is distributed over one or multiple MCCAOP Advertisements elements. Each set of advertised MCCAOP reservations can be partial or complete, and has an advertisement identification number, advertisement sequence number, or >>ID<<, that identifies advertisements elements that belong to the same set, that is, have been chosen to be advertised at the same time.

Reference will now be made in detail to example embodiments, which are illustrated in the accompanying drawing, wherein like reference signs refer to like elements throughout.

FIG. 1 illustrates the general idea, which is to fix a distribution of tracked MCCAOP reservations—hereinafter also generally referred to as >>reservations<<—to specific MCCAOP Advertisements Elements—hereinafter also generally referred to as >>advertisements elements<<. In other words a fixed mapping between a tracked reservation and advertisements element identifier is achieved.

As an example, in normal operations, a first reservation >>A<< will be always placed in advertisement element 0 in every transmitted advertisement. The consequence is that each advertisements element can be considered as a complete set of MCCAOP reservations on its own.

If a reservation is not advertised anymore in an advertisements element with the same advertisement element identifier, it can be deleted from the set of tracked MCCAOP reservations at the receiver of the advertisement element, because the advertisement element is considered to contain the complete set of reservations assigned to its ID. If there is a new reservation in the advertisements element, the new reservation will be added.

In the following section, an advertisement of a new tracked MCCAOP reservation is described, which is e.g. the consequence of an addition of a reservation.

A reporting mesh station assigns an Advertisement Element Identifier >>outgoing_adv_elt_ID<< to this MCCAOP reservation. It is assumed that an advertisements element with this identifier has still some space in order to include an additional reservation. The new reservation is advertised in an MCCAOP Advertisement Element with this Advertisements Element Identifier. There are several possible embodiments to advertise the new reservation:

transmitting a partial advertisement of this MCCAOP Advertisement element, that is, only the new tracked MCCAOP reservation or the new tracked MCCAOP reservation together with a subset of the tracked MCCAOP reservations that are assigned to this Advertisements Element Identifier are advertised in the advertisement element. In one embodiment, which is using an indication of a partial element, a partial element subfield may be set to a value indicating a partial advertisement, transmitting a complete advertisement of this MCCAOP Advertisement element, that is, all tracked MCCAOP reservations that are assigned to this Advertisements Element Identifier are advertised in this advertisements element, including the new tracked MCCAOP reservation. In one embodiment, which is using an indication of a partial element, a partial element subfield, or, alternatively, a corresponding partial report subfield may be set to a value indicating a complete advertisement.

transmitting more than one or all MCCAOP Advertisements elements including the advertisements element with this reservation.

In the following section, an advertisement of a tracked MCCAOP reservation is described, which is e.g. the consequence of a deleted or a torn down reservation.

The advertisements element with the advertisements element identifier >>outgoing_adv_elt_ID<< of the torn down reservation is advertised. It does contain all tracked MCCAOP reservations that are assigned to this Advertisements Element Identifier >>outgoing_adv_elt_ID<< except the torn down reservation.

This is a complete advertisement of this MCCAOP Advertisements element in order to be able to delete the torn down reservation at the recipient. In one embodiment, which is using an indication of a partial element, a partial element subfield, or, alternatively, a corresponding partial report subfield may be set to a value indicating a complete advertisement.

In the following section, a movement of a reservation between advertisements elements is described.

As a consequence of considering a specific advertisement element to contain a complete set of channel reservations assigned to said advertisement identification number, advertisements elements having different advertisements element identifiers are considered as independent sets of complete advertisements of reservations. Hence, the reservation that is going to be moved to an advertisements element with a different advertisement element identifier needs to be removed from the old advertisement element and added to the new advertisement element.

Two advertisements elements have to be sent:

An advertisements element with the old advertisements element identifier will be sent. This advertisements element has to be complete. It does not contain the moved reservation. This removes the moved reservation from the advertisement with the old advertisements element identifier. A receiving mesh station will remove the reservation from the tracked reservations with the old advertisements element identifier. For details, refer to the section above describing the deletion of a reservation.

An advertisements element with the new advertisements element identifier will be sent. This advertisements element can be partial or complete. It has to include at least the moved reservation. This adds the moved reservation to the advertisement with the new advertisements element identifier. A receiving mesh station will add the moved reservation to the tracked reservations with the new advertisements element identifier. See section above on adding a reservation.

The transmitting mesh station has to change the outgoing_adv_elt_ID for the tracked reservation that is moved between advertisements elements. The receiving mesh station has to change the incoming_adv_elt_ID for the tracked reservation that is moved between advertisements elements.

In an alternative embodiment, the advertisement element with the old advertisement element identifier has not to be sent necessarily, if the recipient can handle the situation that the same reservation seems to be assigned to two different incoming advertisement element identifiers in his set of tracked reservations.

In the following section, a garbage collection is described. Garbage collection is a process of analyzing a plurality of reservations over different advertisement element identifiers and re-arranging the plurality of reservations to a modified set of advertisement element identifiers in order to reduce the number of necessary advertisements elements.

Due to tear down of reservations, a larger number of advertisement element identifiers might be used than actually necessary. Reservations that are assigned to higher advertisement element identifiers can be moved to lower advertisement element identifiers if the capacity of the corresponding advertisements elements permits this. The garbage collection would be a multiple moving of reservations between advertisements elements, which are detailed in the section above describing a movement of a reservation. However, the MCCAOP Advertisements would be only sent out once after the garbage collection.

In the following section, a procedure of reception of advertisements elements at a receiving mesh station is described.

According to a first alternative embodiment using an indication of a partial advertisements element, said indication of a partial advertisements element is set to a value indicating a complete advertisement within the advertisements element. In this embodiment, e.g. a partial advertisements element subfield is set to a value indicating a complete advertisement within the advertisements element.

Equivalent to said first alternative, whereby an indication of a partial advertisements element is set to a value indicating a complete advertisement is another embodiment, wherein the set of advertisements within the advertisements element is always regarded to be complete and an indication of a partial advertisements element is generally not implemented.

The procedure of reception of advertisements elements is as follows: All tracked reservations at the receiving mesh stations that have the same incoming_adv_elt_ID as the Advertisements Element Identifier of the advertisements element;

the same sender as the advertisements element; and;

are not listed as a reservation in the advertisements element;

are deleted from the tracked reservations at the recipient mesh station.

All received reservations are added or updated. The incoming_adv_elt_ID is set to the Advertisements Element Identifier of the advertisements element. The sender of the reservations, if necessary, is set to the transmitter of the advertisements element.

According to a second alternative embodiment using an indication of a partial advertisements element, said indication of a partial advertisements element is set to a value indicating a partial advertisement within the advertisements element. In this embodiment, e.g. a partial advertisements element subfield is set to a value indicating a partial advertisement within the advertisements element.

All received reservations are added or updated. The incoming_adv_elt_ID is set to the Advertisements Element Identifier of the advertisements element. The sender of the reservations, if necessary, is set to the transmitter of the advertisements element.

According to an alternative embodiment, a Last Advertisement Element, e.g. in the format of a subfield, is used. In anticipation of a detailed description of said Last Advertisement Element further down below, an alternative procedure using said Last Advertisement Element will be described immediately below. For all Advertisements Element Identifiers larger than the used highest value, the highest value is the advertisements element identifier with the Last Advertisements Element subfield set to 1, the corresponding advertisements elements are considered to be complete and empty. That is, all tracked reservations with an incoming_adv_elt_ID from this transmitter that is larger than the Advertisements Element Identifier of the advertisements element with the Last Advertisements Element set to 1, are deleted.

If the partial report subfields are used, the rules are similar, but the settings are only applicable to the corresponding report. With the partial report subfields, it is possible to have a complete report A, so that reservations can be deleted there, but to have only a partial report B, where only new reservations are added.

In the following section, examples of advertising changes in reservations are given.

The advertisement of a deleted reservation will be explained below.

It is assumed that a snapshot of tracked reservations at a recipient station is as follows:

| Reservation | incoming_adv_elt_ID | outgoing_adv_elt_ID |
|---|---|---|
| RA | 2 | x |
| RB | 2 | x |
| RC | 2 | x |
| RD | 2 | x |
| ... | | |

Exemplarily shown are four channel reservations RA, RB, RC, RD, for which a respective incoming advertisement identification number, >>incoming_adv_elt_ID<<, with a value of 2 is saved in the recipient station.

It is further assumed that a snapshot of tracked reservations at a transmitting station is as follows:

| Reservation | incoming_adv_elt_ID | outgoing_adv_elt_ID |
|---|---|---|
| RA | x | 2 |
| RB | x | 2 (torn down) |
| RC | x | 2 |
| RD | x | 2 |
| ... | | |

It is assumed, that reservation RB is torn down. This teardown has to be advertised to the recipient mesh station in order to delete reservation RB from the set of tracked reservations at the recipient mesh station.

To this end, the transmitting mesh station constructs an advertisement element including the following content:
Advertisements Element Identifiers:=2 (outgoing_adv_elt_ID)
List of reservations: RA, RC, RD.

At the receiving station, reservations RA, RC, and RD are updated, because the incoming_adv_elt_ID is 2, which is the same as the advertisements element identifier of the received advertisements element. No new reservations are added, because all reservations of the advertisements element have been already tracked by the recipient mesh stations.

Since the advertisement element with the advertisement element identifier incoming_adv_elt_ID=2 is preferably considered to contain a complete set of channel reservations assigned to said advertisement identification number, tracked reservations with incoming_adv_elt_ID=2 and received from the transmitting station that are not listed in the received advertisement element are consequently deleted from the set of tracked reservations. This is the case for reservation RB.

Alternatively, according to an alternative embodiment using an indication of a partial element, a partial Advertisements Element flag may be set to a value indicating a complete advertisement. The result is, then, the same: the advertisement element with the advertisement element identifier incoming_adv_elt_ID=2 is accordingly considered to contain a complete set of channel reservations assigned to said advertisement identification number. Tracked reservations with incoming_adv_elt_ID=2 and received from the transmitting station that are not listed in the received advertisement element are consequently deleted from the set of tracked reservations. This is the case for reservation RB.

The snapshot of tracked reservations at the recipient mesh station after reception and processing of the advertisement element by the recipient station is shown below.

| Reservation | incoming_adv_elt_ID | outgoing_adv_elt_ID |
|---|---|---|
| RA | 2 | x |
| RC | 2 | x |
| RD | 2 | x |
| ... | | |

The snapshot of tracked reservations at the transmitting mesh station after the tear down of reservation RB is shown below.

| Reservation | incoming_adv_elt_ID | outgoing_adv_elt_ID |
|---|---|---|
| RA | x | 2 |
| RC | x | 2 |
| RD | x | 2 |
| ... | | |

Now, the advertisement of an addition of a reservation will be explained below.

It is assumed that a snapshot of tracked reservations at a recipient station is as follows:

| Reservation | incoming_adv_elt_ID | outgoing_adv_elt_ID |
|---|---|---|
| RA | 2 | x |
| RC | 2 | x |
| RD | 2 | x |
| ... | | |

It is further assumed that a snapshot of tracked reservations at a transmitting station is as follows:

| Reservation | incoming_adv_elt_ID | outgoing_adv_elt_ID |
|---|---|---|
| RA | x | 2 |
| RB | x | 2 |
| RC | x | 2 |
| RD | x | 2 |
| RE | x | 1 (added) |
| ... | | |

A new reservation RE has been set up at the transmitting mesh station, and this has to be advertised to the recipient mesh station in order to add reservation RE to the set of tracked reservations at the recipient mesh station.

To this end, the transmitting mesh station constructs an advertisement element including the following content:
Advertisements Element Identifiers:=1 (outgoing_adv_elt_ID)
List of reservations: RE.

Reservation RE is added to the set of tracked reservations, there does not exist a tracked reservation RE at the recipient mesh station with incoming_adv_elt_ID=1 from the transmitting mesh station.

Since the advertisement element with the advertisement element identifier incoming_adv_elt_ID=1 contains an advertisement element identifier for which currently no tracked reservations received from the transmitting station are recorded, reservation RE is added to the set of tracked reservations at the receiving station. This follows the preferred embodiment whereby an advertisement element characterized by a specific advertisement element identifier is considered to contain a complete set of channel reservations assigned to said advertisement identification number.

Alternatively, according to an alternative embodiment using an indication of a partial element, a partial Advertisements Element flag in the received advertisements element may be set to a value indicating a partial advertisement. The result is, then, the same: the advertisement element with the advertisement element identifier incoming_adv_elt_ID=1 is accordingly considered to contain a complete set of channel reservations assigned to said advertisement identification number. Tracked reservations with incoming_adv_elt_ID=1 and received from the transmitting station that are listed in the received advertisement element are consequently added to the set of tracked reservations. This is the case for reservation RE. No tracked reservations with incoming_adv_elt_ID=1 and received from the transmitting station will be deleted.

The snapshot of tracked reservations at the recipient mesh station after reception and processing of the advertisement element by the recipient station is shown below.

| Reservation | incoming_adv_elt_ID | outgoing_adv_elt_ID |
|---|---|---|
| RA | 2 | x |
| RC | 2 | x |
| RD | 2 | x |
| RE | 1 | x |
| ... | | |

The snapshot of tracked reservations at the transmitting mesh station after the addition of reservation RE is shown below.

| Reservation | incoming_adv_elt_ID | outgoing_adv_elt_ID |
|---|---|---|
| RA | x | 2 |
| RC | x | 2 |
| RD | x | 2 |
| RE | x | 1 |
| ... | | |

Now, the advertisement of a movement of a reservation will be explained below. Exemplarily, a movement of reservation RA from outgoing_adv_elt_ID 2 to outgoing_adv_elt_ID 0 will be shown.

To this end, the transmitting mesh station constructs two advertisement elements including the following content:

A first advertisement element sent by the transmitting mesh station includes the following content:
Advertisements Element Identifiers:=0 (new outgoing_adv_elt_ID)
List of reservations: RA.

A second advertisement element sent by the transmitting mesh station includes the following content:
Advertisements Element Identifiers:=2 (old outgoing_adv_elt_ID)
List of reservations: RC, RD.

The first advertisement element is processed in the same way as described in section >>addition of reservation<< above. The second advertisement element is processed in the same way as described in section >>deletion of reservation<< above.

The snapshot of the tracked reservations at the recipient mesh station after the reception and processing of both advertisement elements by the recipient station is shown below.

| Reservation | incoming_adv_elt_ID | outgoing_adv_elt_ID |
|---|---|---|
| RA | 0 | x |
| RC | 2 | x |
| RD | 2 | x |
| RE | 1 | x |
| ... | | |

The snapshot of the tracked reservations at the transmitting mesh station after the movement of reservation RA is shown below.

| Reservation | incoming_adv_elt_ID | outgoing_adv_elt_ID |
|---|---|---|
| RA | x | 0 (2-->0) |
| RC | x | 2 |
| RD | x | 2 |
| RE | x | 1 |
| ... | | |

Now, a process of garbage collection will be explained below, by which all reservations have to be moved to the advertisements element identifier 0, i.e. the lowest number of advertisements element identifier.

To this end, the transmitting mesh station constructs an advertisement element including the following content:
Advertisements Element Identifiers:=0 (new outgoing_adv_elt_ID)
List of reservations: RC, RD, RE.

The advertisement element is processed in the same way as described in section >>addition of reservation<< above.

Only one advertisement element is constructed, and its advertisement element index of 0 is the highest used value. This may be optionally indicated by a Last Advertisements Element subfield, whereby the Last Advertisements Element subfield is set to 1.

For all Advertisements Element Identifiers larger than the used highest value—the highest value is the Advertisement Element Index with the Last Advertisements Element subfield set to 1—it may be optionally deducted that the corresponding advertisements elements are complete and empty.

The recipient mesh station can implicitly assume that all other advertisements having a higher Advertisement Element Identifier than 0 would be empty and complete, so that all reservations with those imaginary incoming_adv_elt_IDs could be removed as described in section >>deletion of reservation<< above.

In essence, the incoming_adv_elt_IDs of reservations RC, RD, and RE in the set of tracked reservations at the recipient mesh station have to be changed from 2, or 1, respectively, into a value of 0.

The snapshot of the tracked reservations at the recipient mesh station after the reception and processing of the advertisement element by the recipient station is shown below.

| Reservation | incoming_adv_elt_ID | outgoing_adv_elt_ID |
|---|---|---|
| RA | 0 | x |
| RC | 0 | x |
| RD | 0 | x |
| RE | 0 | x |
| ... | | |

The snapshot of the tracked reservations at the transmitting mesh station after the process of garbage collection is shown below.

| Reservation | incoming_adv_elt_ID | outgoing_adv_elt_ID |
|---|---|---|
| RA | x | 0 |
| RC | x | 0 (2->0) |
| RD | x | 0 (2->0) |
| RE | x | 0 (1->0) |
| ... | | |

In the following, some exemplary embodiments of the invention are provided, by which a possible data structure in accordance with the known IEEE 802.11s Draft Standard for WLAN Mesh Networking, version D7.03 is proposed, which partially amends the data structure of the draft.

It will be readily understood that the general concept of the disclosure, which is generally providing a fixed mapping between tracked reservations and respective advertisements elements identifiers, is not limited to a particular data structure. By contrary, the concept allows an implementation for any kind of data structure, e.g. data fields, data bitmaps and so forth.

The exemplary embodiments provide procedures for performing the advertisements of MCCAOP reservations in an IEEE 802.11s wireless mesh network that uses the MCCA media access mechanism. The exemplary embodiments define flags and corresponding rules that allow a flexible advertisement of tracked reservations, e.g. a partial flag, a concept of complete advertisement sets per MCCAOP Advertisement element etc. The exemplary embodiments help to provide unambiguous interoperability between IEEE 802.11s devices with MCCA of different vendors.

Hereinafter, a flag is to be understood as a Boolean variable, which is usually carried by a field having a length of one bit. This Boolean variable can either carry a value of >>zero<<, also referred to as >>false<< or, alternatively, a value of >>one<<, also referred to as >>true<<. It will be readily understood that flags and/or fields can alternatively have an opposite presentation for the truth values: true might be one or zero, false might be zero or one, respectively.

FIG. 2 shows an exemplary structure of an MCCAOP advertisements element according to an exemplary embodiment.

An MCCAOP Advertisements element is used by a mesh station to advertise MCCAOP reservations to its neighbors. This MCCAOP Advertisements element can be carried in selected Beacon frames with a chosen frequency. The MCCAOP Advertisements element is also transmitted in an MCCAOP Advertisements frame. The format of the MCCAOP Advertisements element is shown in FIG. 2.

The MCCAOP Advertisement Sequence Number field, which is amended by the exemplary embodiment is one octet in length and coded as an unsigned integer.

The MCCAOP Advertisement Sequence Number, together with the—not shown—MAC address of a—not shown—transmitter of the MCCAOP Advertisements element uniquely identifies an MCCAOP advertisement and provides a unique identifier and a chronological order of different advertisements of the same mesh station.

The amended MCCA Information field is now four (previously three) octets in length and is used to provide information on the MCCAOP reservations.

An exemplary format of an MCCA Information field is illustrated in FIG. 3. The MCCA Information field consists of nine subfields.

Hereinafter, a flag within a subfield is to be understood as a Boolean variable, which is usually carried by a field having a length of one bit. This Boolean variable can either carry a value of >>zero<<, also referred to as >>false<< or, alternatively, a value of >>one<<, also referred to as >>true<<. It will be readily understood that flags and/or fields can alternatively have an opposite presentation for the truth values: true might be one or zero, false might be zero or one, respectively.

The TX-RX Report Present subfield is preferably one bit in length. It is set to a binary value of one if a TX-RX Report field is present in the MCCAOP Advertisement element and set to a binary value of zero if no TX-RX Report field is present.

The Broadcast Report Present subfield is preferably one bit in length. It is set to a value of one if a Broadcast Report field is present in the MCCAOP Advertisement element and set to a value of zero if no Broadcast Report field is present.

The Interfering Report Present subfield is preferably one bit in length. It is set to a value of one if an Interfering Times Report field is present in the MCCAOP Advertisement element and set to a value of zero if no Interfering Times Report field is present.

The Partial Advertisements Element subfield is preferably one bit in length. It is set to a value of zero if the MCCAOP Advertisements element contains all MCCAOP reservations assigned to its Advertisements Element Identifier (complete set of MCCAOP reservations in MCCAOP Advertisements element). It is set to a value of one if the MCCAOP Advertisements element does not contain all MCCAOP reservations assigned to its Advertisements Element Identifier (partial set of MCCAOP reservations in MCCAOP Advertisements element)

The Last Advertisements Element subfield is preferably one bit in length. It is set to a value of zero if the MCCAOP Advertisements element is not the last one of a series of MCCAOP Advertisements elements and it is set to a value of one if the MCCAOP Advertisements element is the last one of a series of MCCAOP Advertisements elements.

The Advertisements Element Identifier subfield is an m-bit unsigned integer. It identifies the MCCAOP Advertisements element and its carried MCCAOP reservations.

m, the length of the Advertisements Element Identifier subfield in bits, should be at least three. Its maximum value according to FIG. 3 would be ten. A reasonable value would be four.

FIG. 4 shows an exemplary structure of an alternative MCCA information field according to an alternative embodiment.

This alternative structure of the MCCA Information field replaces the Partial Advertisements Element subfield according to FIG. 3, by three subfields denoted >>Partial TX-RX Report<<, >>Partial Broadcast Report<< and >>Partial Interfering Report<<.

The Partial TX-RX Report subfield is preferably one bit in length. It is set to a value of zero if the MCCAOP Advertisements element contains all MCCAOP reservations of the TX-RX report assigned to its Advertisement Element Identifier (complete set of MCCAOP reservations belonging to TX-RX report in MCCAOP Advertisements element). It is set to a value of one if the MCCAOP Advertisements element does not contain all MCCAOP reservations of the TX-RX report assigned to its Advertisement Element Identifier (partial set of MCCAOP reservations belonging to TX-RX report in MCCAOP Advertisements element)

The Partial Broadcast Report subfield is preferably one bit in length. It is set to a value of zero if the MCCAOP Advertisements element contains all MCCAOP reservations of the Broadcast report assigned to its Advertisement Element Identifier (complete set of MCCAOP reservations belonging to Broadcast report in MCCAOP Advertisements element). It is set to a value of one if the MCCAOP Advertisements element does not contain all MCCAOP reservations of the Broadcast report assigned to its Advertisement Element Identifier (partial set of MCCAOP reservations belonging to Broadcast report in MCCAOP Advertisements element)

The Partial Interfering Report subfield is preferably one bit in length. It is set to a value of zero if the MCCAOP Advertisements element contains all MCCAOP reservations of the Interfering report assigned to its Advertisement Element Identifier (complete set of MCCAOP reservations belonging to Interfering report in MCCAOP Advertisements element). It is set to a value of one if the MCCAOP Advertisements element does not contain all MCCAOP reservations of the Interfering report assigned to its Advertisement Element Identifier (partial set of MCCAOP reservations belonging to Interfering report in MCCAOP Advertisements element)

Each mesh station, that has to track MCCAOP reservations, has to know for each tracked MCCAOP reservation the advertisements element identifier in which it has been received from which neighboring mesh station (incoming_adv_elt_ID), and the advertisements element identifier in which the mesh station will advertise this MCCAOP reservation (outgoing_adv_elt_ID). The same reservation might be received from different mesh stations (the advertisements element identifier might be the same or not) or from the same mesh station with different advertisements element identifiers. The receiving mesh station has to be able to detect such duplicates and to act accordingly.

Another alternative representation of the general idea of the disclosure is to omit the Last Advertisements Element subfield and always to assume that there are $2^m$ advertisements elements with advertisements element identifiers from 0 to $(2^m)-1$. The consequence is that advertisements elements that have a higher advertisements element identifier than the one with the Last Advertisements Element subfield set to one (if the Last Advertisements Element subfield where there) need to be advertised.

However, if m is not too large, this is not a problem, because these advertisements are empty and require only 7 octets each. For m=4 this would mean at maximum 15*7=105 octets more, in frames that can be easily more than 2000 octets long. The concept of partial advertisements elements (or of partial reports in advertisements elements) still needs to be there in order to allow the overflowing of MCCAOP reservations in (the last) advertisements element.

In the following section, an embodiment is described, by which an optional Advertisement Sequence Number is used.

A usage of an Advertisement Sequence Number allows a more flexible use of the advertisements elements, especially the use of partial advertisements. The Advertisement Sequence Number allows a recognition whether an advertisement has been missed (sequence number functionality), or, a recognition whether all advertisements elements belong to the same advertisement, i.e. the advertised tracked reservations at a certain point in time.

Having a separate advertisement sequence number per advertisements element, however, does not make much sense, because advertisements are only sent to neighbors and simple rules can ensure the correct functionality.

The advertisement sequence number has a scope of the whole set of tracked MCCAOP reservations of a mesh station. The advertisement sequence number needs to be incremented by one, if a transmission of an advertisement sequence number in conjunction with the current advertisement sequence number would lead to inconsistencies. This is the case, if an advertisements element with the current advertisement sequence number has been sent and the content of the advertisements element with this advertisements element number has changed.

However, because each advertisements element is considered based on its advertisements element identifier, as a separate, independent advertisement, an advertisements element with the current advertisement sequence number might not have been sent, because there have been no changes and the advertisements element with the latest but smaller advertisement sequence number has been carried forward.

If an advertisement contains only such kind of advertisements elements, the advertisements sequence number does not need to be incremented.

If an advertisement sequence number is used, non-conflicting changes to multiple advertisements elements can be covered by a single increment of the advertisement sequence number. Such changes are, for instance, the movement of a reservation to a different advertisement element identifier or the garbage collection.

The main purpose of the advertisements sequence number is to determine whether a mesh station has received all advertisements elements for a certain advertisement point in time. That is, the received advertisements elements for the advertisement point in time have all the same advertisements sequence number and the advertisements element identifiers are a complete sequence from 0 to the identifier where the last advertisement element flag is set to true. This is especially useful if advertisements elements with the same advertisement sequence number are sent in different frames, e.g. subsequent beacons.

However, the proposed concept according to the invention, which is providing a fixed mapping between the tracked reservations and the advertisements elements identifiers, allows to avoid sending unchanged advertisements elements and to carry their advertised reservations forward.

This may result in an ambiguity at the receiver of the advertisements elements—did it miss the not-sent advertisements element or is it carried forward? Possible solutions to this ambiguity are:

accept this ambiguity and send periodically or once in a while a complete set of advertisements elements;

always send all advertisements elements for a specific advertisements sequence number;

use a flag (subfield in field MCCA information) to indicate whether all advertisements elements for this advertisement point in time (same advertisements sequence number) are sent or not. This flag is implemented in a subfield >>All Advertisements Elements<< of a modified MCCA information field shown in FIG. 5.

According to FIG. 5, the >>All Advertisements Elements<< subfield is preferably one bit in length. It is set to a value of one if all MCCAOP Advertisements elements with the same Advertisements Sequence number, starting with Advertisements Element Identifier 0 sequentially up to the Advertisements Element Identifier of the MCCAOP Advertisements element with the Last Advertisements Element subfield set to a value of one are sent. Otherwise, the All Advertisements Elements subfield is set to a value of zero.

As to the composition of MCCAOP Advertisements elements the setting of respective fields is described below.

If a mesh station reports all tracked reservations in a single (one) MCCAOP Advertisements element, it shall
set the Advertisements Element Identifier subfield of the MCCA Information field in the MCCAOP Advertisements element to a value of zero;
set the Last Advertisements Element subfield of the MCCA Information field in the MCCAOP Advertisements element to a value of one; and
set the Partial Advertisements Element subfield to a value of zero.

If a mesh station reports all tracked reservations in no more than $2^m$ MCCAOP Advertisements elements, the mesh station shall
number these MCCAOP Advertisements elements consecutively starting from a value of zero in the Advertisements Element Identifier subfield;

set the Last Advertisements Element subfield to a value of one for the MCCAOP Advertisements element with the highest value for the Advertisements Element Identifier subfield, and set the Last Advertisements Element subfield to a value of zero for the other MCCAOP Advertisements elements; and;

set the Partial Advertisements Element subfield to a value of zero

If the number of MCCAOP Advertisement elements for all tracked reservations exceeds $2^m$, it shall number these MCCAOP Advertisements elements consecutively starting from a value of zero in the Advertisements Element Identifier subfield up to $2^m$, the Advertisements Element Identifier is set to $2^m$ in all remaining MCCAOP Advertisements elements, set the Last Advertisement subfield of the MCCA Information field in the MCCAOP Advertisements elements to a value of zero; and;

set the Partial Advertisements Element subfield to a value of zero for MCCAOP Advertisements elements with Advertisement Element Identifiers smaller than the highest value, and to a value of one for MCCAOP Advertisements elements with the highest value for the Advertisements Element Identifier subfield.

In the latter case, all MCCAOP Advertisements elements except the one with the highest Advertisements Element Identifier are complete, so that torn down MCCAOP reservations can be advertised in those advertisement elements. The MCCAOP Advertisements element with the highest Advertisements Element Identifier is so to say the overflow advertisements element. Here, only partial advertisements of this advertisements element are possible if it is actually overflowing.

In principle, it is possible to use any and multiple advertisements element identifiers for an overflowing MCCAOP Advertisements element. In such a case, advertisements elements with such an identifier can be only partial, due to the overflowing, and the Partial Advertisements Element subfield is set to a value of one. In order to be able to announce torn down reservations, at least one advertisements element should not be overflowing, so that a complete advertisements element can be transmitted (Partial Advertisements Element subfield set to a value of zero).

What is claimed is:

1. A method for advertising channel reservations by an advertisement in a wireless mesh network, the advertisement being identified by an advertisement identification number and being adapted for at least partially advertising channel reservations known by a transmitting node via one or multiple advertisement elements, the method comprising for each advertisement element:
   mapping at least one channel reservation to an advertisement element identifier in a fixed mapping, the advertisement element identifier identifying an advertisement element;
   considering said advertisement element to contain a set of channel reservations assigned to said advertisement identification number; and
   advertising said reservation by transmitting said advertisement element identified by said advertisement element identifier.

2. A method according to claim 1, comprising advertising a deletion of a reservation by transmitting an advertisement element containing a complete set of all channel reservations mapped to an advertisement element identifier identifying the said advertisement element in which the reservation to be deleted is omitted from a complete set of reservations contained in said advertisement element.

3. A method according to claim 1, comprising advertising an addition of a reservation by transmitting an advertisement element containing a complete or partial set of all channel reservations mapped to an advertisement element identifier identifying the said advertisement element in which the reservation to be added is contained in the complete or partial set of reservations.

4. A method according to claim 1, wherein a fixed number of advertisements elements is provided.

5. A method according to claim 1, wherein said advertisement element includes a field indicating whether all advertisement elements of an advertisement are advertised.

6. A method according to claim 1, wherein said advertisement element includes a field indicating the highest used advertisement element identifier.

7. A method according to claim 6, wherein advertisement elements with an advertisement element identifier exceeding the highest used identifier are considered to be empty and complete.

8. A method according to claim 1, wherein said advertisement element is included in a MCCAOP advertisements frame.

9. A transmitting node in a wireless mesh network comprising:
   a processor; and
   non-transitory computer-readable media storing computer-readable instructions executable by the processor to perform a method for advertising channel reservations by an advertisement in the wireless mesh network, the advertisement being identified by an advertisement identification number and being adapted for at least partially advertising channel reservations known by the transmitting node via one or multiple advertisement elements, the method comprising for each advertisement element:
      mapping at least one channel reservation to an advertisement element identifier in a fixed mapping, the advertisement element identifier identifying an advertisement element;
      considering said advertisement element to contain a set of channel reservations assigned to said advertisement identification number; and
      advertising said reservation by transmitting said advertisement element being characterized by said advertisement element identifier.

10. A transmitting node according to claim 9, wherein the processor and the non-transitory computer-readable media storing the computer-readable instructions executable by the processor advertise a deletion of a channel reservation by transmitting an advertisement element containing a complete set of all channel reservations mapped to an advertisement element identifier identifying the said advertisement element in which the channel reservation to be deleted is omitted in the said complete set of channel reservations.

11. A transmitting node according to claim 9, wherein the processor and the non-transitory computer-readable media storing the computer-readable instructions executable by the processor advertise an addition of a channel reservation by transmitting an advertisement element containing a complete or partial set of all channel reservations mapped to an advertisement element identifier identifying the said advertisement element in which the reservation to be added is contained in the said complete or partial set of channel reservations.

12. A transmitting node according to claim 9, wherein the processor and the non-transitory computer-readable media storing the computer-readable instructions executable by the processor provide a fixed number of advertisements elements.

13. A transmitting node according to claim 9, wherein the said advertisement element transmitted by the processor and the non-transitory computer-readable media storing the computer-readable instructions executable by the processor includes a field indicating whether all advertisement elements of the advertisement are advertised.

14. A transmitting node according to claim 9, wherein the said advertisement element transmitted by the processor and the non-transitory computer-readable media storing the computer-readable instructions executable by the processor includes a field indicating the highest used advertisement element identifier.

15. A transmitting node according to claim 9, wherein the said advertisement element transmitted by the processor and the non-transitory computer-readable media storing the computer-readable instructions executable by the processor is included in an MCCAOP advertisements frame.

16. Computer program product, which contains a program code stored on a non-transitory computer-readable medium and which, when executed by a processor of a transmitting node in a mesh network, carries out a method for advertising channel reservations by an advertisement in a wireless mesh network, the advertisement being identified by an advertisement identification number and being adapted for at least partially advertising channel reservations known by the transmitting node via one or multiple advertisement elements, the method comprising for each advertisement element:
- mapping at least one channel reservation to an advertisement element identifier in a fixed mapping, the advertisement element identifier identifying an advertisement element;
- considering said advertisement element to contain a set of channel reservations assigned to said advertisement identification number; and
- advertising said reservation by transmitting said advertisement element being characterized by said advertisement element identifier.

17. A computer program product according to claim 16, wherein the program code is configured to advertise a deletion of a channel reservation by transmitting an advertisement element containing a complete set of all channel reservations mapped to an advertisement element identifier identifying the said advertisement element in which the reservation to be deleted is omitted from a complete set of channel reservations.

18. A computer program product according to claim 16, wherein the program code is configured to advertise an addition of a channel reservation by transmitting an advertisement element containing a complete or partial set of all channel reservations mapped to an advertisement element identifier identifying the said advertisement element in which the reservation to be added is contained in the complete or partial set of channel reservations.

19. A computer program product according to claim 16, wherein the program code is configured to provide a fixed number of advertisements elements.

20. A computer program product according to claim 16, wherein said advertisement element includes a field indicating whether all advertisement elements of an advertisement are advertised.

21. A computer program product according to claim 16, wherein said advertisement element includes a field indicating the highest used advertisement element identifier.

22. A computer program product according to claim 21, wherein advertisement elements with an advertisement element identifier exceeding the highest used identifier are considered empty and complete.

23. A computer program product according to claim 16, wherein said advertisement element is included in a MCCAOP advertisements frame.

24. A transmitting node according to claim 20, wherein the processor and the non-transitory computer-readable media storing the computer-readable instructions executable by the processor considers advertisement elements with an advertisement element identifier exceeding the highest used identifier to be empty and complete.

* * * * *